US007323025B2

(12) United States Patent
Weidner

(10) Patent No.: US 7,323,025 B2
(45) Date of Patent: Jan. 29, 2008

(54) SYSTEM AND METHOD FOR PROTECTION/ISOLATION AGAINST INFECTIONS

(75) Inventor: Samuel Weidner, Zikhron Yaaqov (IL)

(73) Assignee: Beth-El Zikhron-Ya' Aqov Industries, Ltd, Zikhron Yaakov (IL)

( * ) Notice: Subject to any disclaimer, the term of this patent is extended or adjusted under 35 U.S.C. 154(b) by 300 days.

(21) Appl. No.: 10/885,231

(22) Filed: Jul. 7, 2004

(65) Prior Publication Data

US 2005/0050804 A1 Mar. 10, 2005

(30) Foreign Application Priority Data

Jul. 9, 2003 (IL) ..................................... 156836

(51) Int. Cl.
*B01D 46/00* (2006.01)

(52) U.S. Cl. ............... 55/385.2; 55/385.1; 55/DIG. 18; 55/DIG. 29; 55/DIG. 46; 454/187; 600/21

(58) Field of Classification Search ............... 55/385.1, 55/385.2, DIG. 18, DIG. 29, DIG. 46; 454/187; 600/21

See application file for complete search history.

(56) References Cited

U.S. PATENT DOCUMENTS

| | | | | |
|---|---|---|---|---|
| 3,345,996 A | | 10/1967 | Sadove et al. | |
| 3,363,532 A | | 1/1968 | Horneff | |
| 3,505,989 A | * | 4/1970 | Truhan | 600/21 |
| 3,601,031 A | * | 8/1971 | Abel et al. | 454/187 |
| 3,802,416 A | * | 4/1974 | Cazalis | 600/21 |
| 4,129,122 A | * | 12/1978 | Dout et al. | 600/21 |
| 4,581,986 A | | 4/1986 | Conklin et al. | |
| 5,064,457 A | * | 11/1991 | Weber | 55/385.2 |
| 5,277,654 A | * | 1/1994 | Fenn et al. | 454/141 |
| 5,728,041 A | | 3/1998 | Fowler, Jr. | |
| 6,508,850 B1 | * | 1/2003 | Kotliar | 55/385.2 |
| 6,924,877 B2 | * | 8/2005 | Nakano et al. | 355/30 |
| 6,966,937 B2 | * | 11/2005 | Yachi et al. | 55/385.2 |
| 2002/0087045 A1 | * | 7/2002 | Chamorro-Perez et al. | 600/21 |
| 2006/0020159 A1 | * | 1/2006 | Ellen | 600/21 |

FOREIGN PATENT DOCUMENTS

EP 0619108 A1 10/1994

* cited by examiner

*Primary Examiner*—Duane Smith
*Assistant Examiner*—Minh-Chau T. Pham
(74) *Attorney, Agent, or Firm*—Jacobson Holman PLLC

(57) ABSTRACT

There is provided a system for protection/isolation against infections or disease-bearing persons including an enclosure defining at least two chambers, an isolation chamber having at least one entering and exiting closable opening, at least one ambient air inlet and at least one air outlet connectable to a blower/filter, and an airlock chamber juxtaposed the opening having an access and egress closable aperture, means for forming under-pressure in the isolation chamber and airlock chamber, and at least one biological filter operationally connected to the means for forming under-pressure. A method for protecting/isolating against infection or disease-bearing persons, is also provided.

19 Claims, 5 Drawing Sheets

SYSTEM AND METHOD FOR PROTECTION/ISOLATION AGAINST INFECTIONS

FIELD OF THE INVENTION

The present invention relates to a system and method for protection/isolation against infections or diseases-bearing persons, as well as to a kit for assembling the system. More particularly, the present invention is concerned with a system and method for providing short term isolation space within or adjacent to an unprotected structure against the danger of infection by a person bearing a disease or infection, which should be kept isolated.

BACKGROUND OF THE INVENTION

As was experienced during the past SARS epidemic, there is an increasing need for isolation possibilities for persons that are, in fact or suspiciously, infected by an epidemic illness. Such isolation requirement is provided by the use of isolation rooms in special hospitals. Hospitals are situated only in a few places in each country and not in the exact location where there is a real need. Third world countries do not have such isolation spaces at all. Isolation rooms are provided with professional air filtration systems, including blowers, which create an under-pressure inside the isolation space and provide a continuous air filtration process to guarantee that only a minimum of bacteria is present inside of the isolation room and that outside, there will be no infection risk at all. The under-pressure is required, in order to ensure a clear direction of airflow from outside atmosphere to inside to the isolation space in case of leaks or openings. Use of this method assures that no contaminated air will leave the isolation space.

DISCLOSURE OF THE INVENTION

It is therefore a broad object of the present invention to provide a system assembled from a kit, that can be deployed at any location such as inside or adjacent to local hospitals that have the need for isolation space. The kit contains all elements needed for isolation purposes, is easily storable, transportable, deployable, installable and grants complete protection against the threat of further infection.

It is a further object of the present invention to provide a protection/isolation system which grants to those people who have to deal with the infected person, i.e., doctors or nurses, some protection even when they are inside of the isolation area. The system is designed in a way that persons keeping in touch with the infected person breathe air that is, with high probability, free of infection potential.

It is still a further object of the present invention to provide a solution enabling medical and nursing personnel to enter and leave the isolation area, without the danger of bringing contaminated air out of the isolation space.

In a preferred embodiment of the present invention, there is provided at least one air filtration unit that sucks air through the isolation space and filters in an efficient way before it leaves towards outside. The obtained under-pressure is higher than 10 Pa. The airflow in the isolation space is from top to bottom. Fresh air is first above the level of the patient and the contaminated air most likely only below the level of the patient. The air is replaced in the isolation area as much as possible, e.g., >10 times per hour, without generation of any draught problem for the patient. Since in the air filtration unit bacteria and viruses are kept and may remain alive, means to kill these, can also be applied.

According to the invention, the above objects are achieved by providing a system for protection/isolation against infections or disease-bearing persons comprising an enclosure defining at least two chambers, an isolation chamber having at least one entering and exiting closable opening, at least one ambient air inlet valve and at least one air outlet connectable to a blower/filter, and an airlock chamber juxtaposed said opening having an access and egress closable aperture, means for forming under-pressure in said isolation chamber and airlock chamber, and at least one biological filter operationally connected to said means for forming under-pressure.

The invention further provides a kit for assembling such a system for protection/isolation against infections or disease-bearing persons.

The invention also provides a method for protecting/isolating against infection or disease-bearing persons, comprising providing such a system and operating said means for forming under-pressure in said chambers.

BRIEF DESCRIPTION OF THE DRAWINGS

The invention will now be described in connection with certain preferred embodiments with reference to the following illustrative figures, so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is an isometric view of a first embodiment of an isolation space according to the present invention;

FIG. 2 is an isometric view of the isolation space of FIG. 1, with an additional filter/blower device at the airlock and a modification thereof;

FIG. 3 is an isometric view of a second embodiment of an isolation space, according to the present invention;

FIG. 4 is an isometric view of a filter/blower unit of FIGS. 2 and 3;

FIG. 5 is a cross-sectional view of the filter/blower unit of FIG. 4;

FIG. 6 is an isometric view of another embodiment of the invention, and

FIGS. 7A and 7B are isometric, and respectively, cross-sectional views of a bottom rail of a framework defining an isolation space.

DETAILED DESCRIPTION OF PREFERRED EMBODIMENTS

Figure 1:
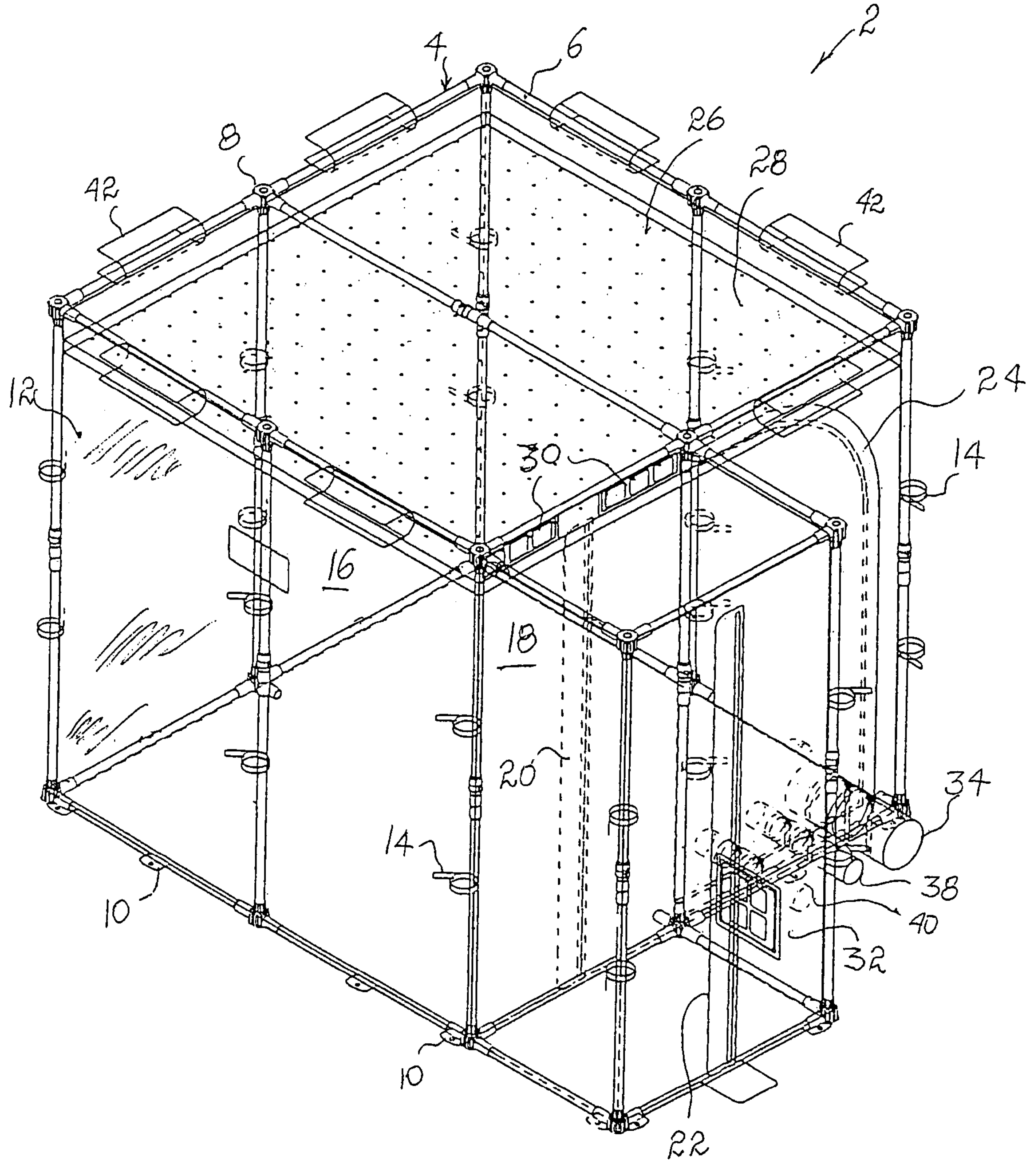
Figure 2:
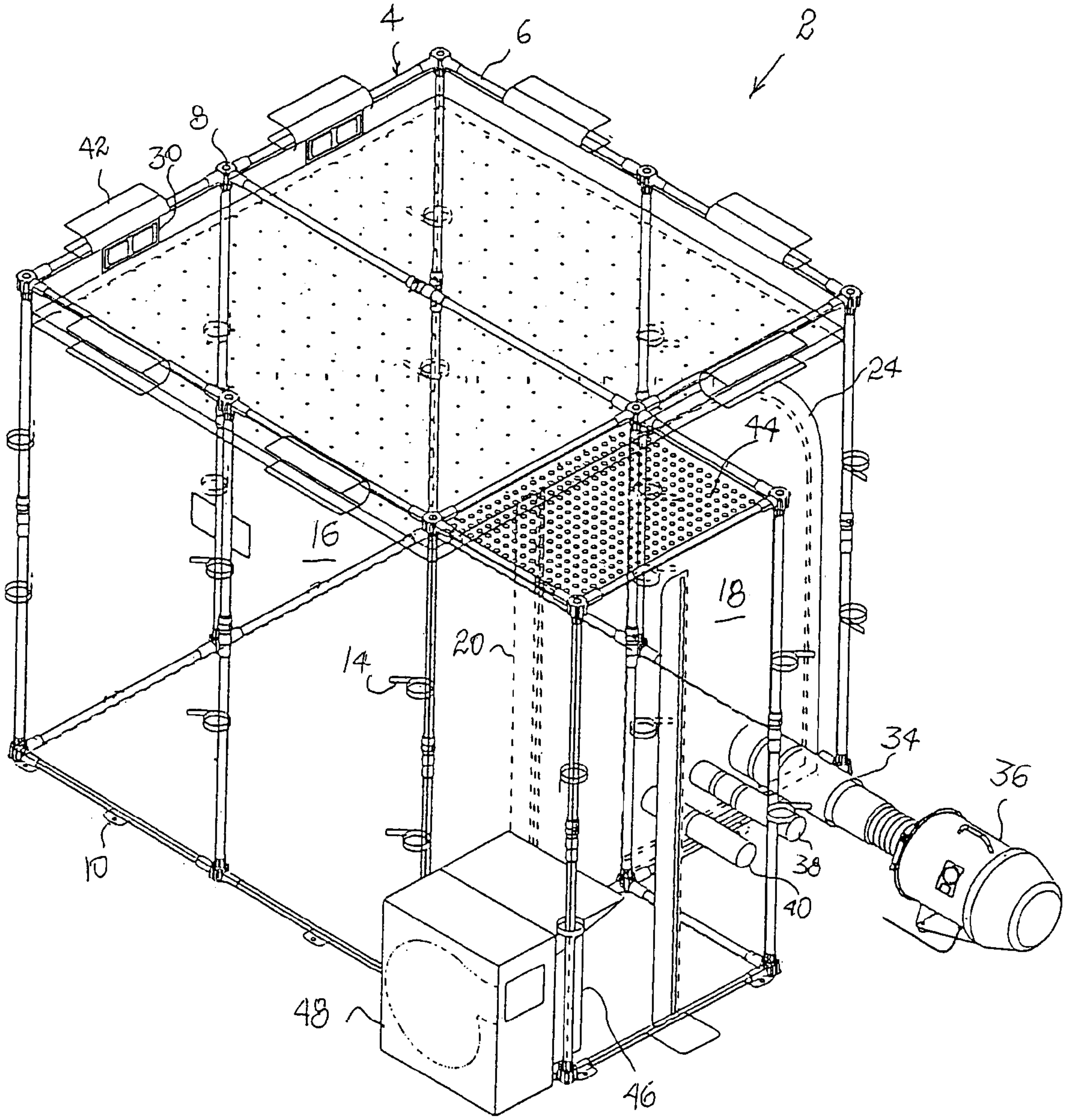

There is illustrated in FIG. 1 a first embodiment of a protection/isolation system 2 against infected or disease-bearing persons, according to the present invention. The system 2 is composed of a framework 4, which advantageously, can be easily assembled and dismantled, e.g., an assembly of rods 6 and suitable interengaging and interlocking joints 8. The framework 4 is provided with members 10 for anchoring it to the ground, or floor, when provided. To the inside or outside of the framework 4 there is attached at least one pre-configured enclosure 12 made of flexible thin material, impermeable to bacteria, and/or viruses and/or germs. The enclosure 12 is attached to the framework 4 by any suitable means 14, for example, simple tie strips, band loops or self-locking bands. Care should be taken to keep the floor part flat, even under the influence of under-pressure. This can be achieved by making the floor of a heavier material than that of the walls. In the embodiment shown, there are formed two chambers, an isolation chamber 16 and an airlock chamber 18, which are in communication via an entrance/exit slot 20 made in the material of the enclosure 12. The interior of the airlock chamber 18 is accessed via closable slot 22. The enclosure 12 is also provided with a closable opening 24 for entering bulky equipment into the chamber 16. The chamber 16 is covered with a ceiling 26 having air inlet holes 28 for obtaining controlled, even distribution of air flowing therethrough. There are also provided above the ceiling 26, air inlets 30 leading to chamber 16 and an air entry valve 32 leading to the airlock chamber 18. Air leaves the isolation chamber 16 through a sleeve 34 to a blower/filter unit 36 (FIG. 2). Two service ports 38, 40 are located adjacent the sleeve 34. Optionally, the system 2 is furnished with brackets 42, facilitating connection to other, like systems, or to stationary structures.

The system 2 shown in FIG. 2 is similar to the system 2 of FIG. 1, except for the air flow passageway to airlock chamber 18, which is different. Here, air is sucked in through the air flow distribution ceiling 44 of the airlock chamber 18, independent from the isolation chamber 16. Air from the airlock chamber 18 exits the airlock through HEPA filter 46 and, a blower 48 sucking the air from the ceiling 44 through the airlock chamber 18 via the filter 46 to the outside.

Figure 3:
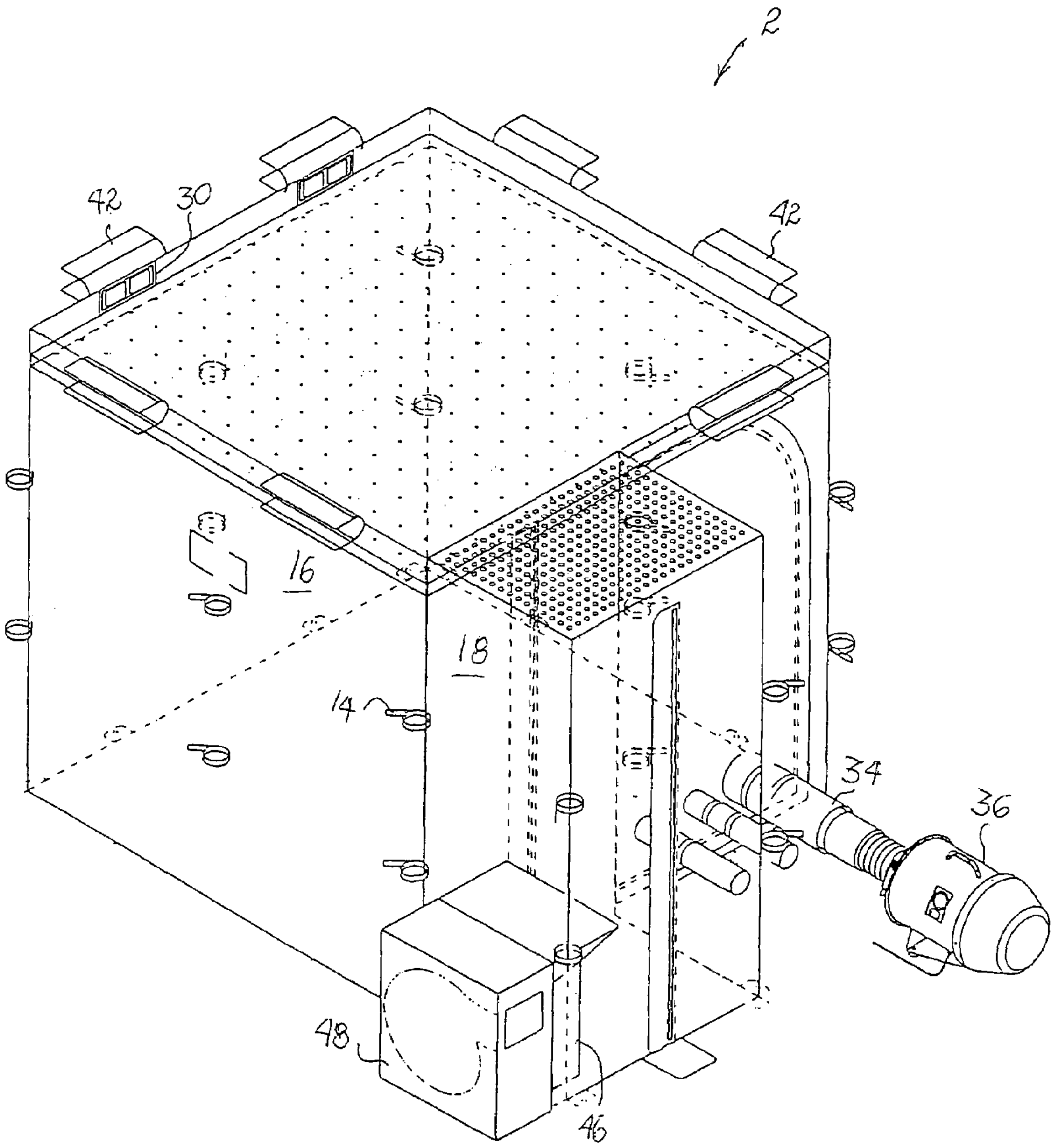

Referring to FIG. 3, there is illustrated the system 2 according to the present invention, similar to system 2 of FIG. 2, however, according to this embodiment, the system does not depict the framework 4. Instead, the thin flexible enclosure 12 forming the chamber 16 and airlock chamber 18, as well as other structural elements and units, are suspended and affixed via means 14 and brackets 42 to frameworks or stationary structures disposed within the enclosure or located adjacent thereto (not shown).

Figure 4:
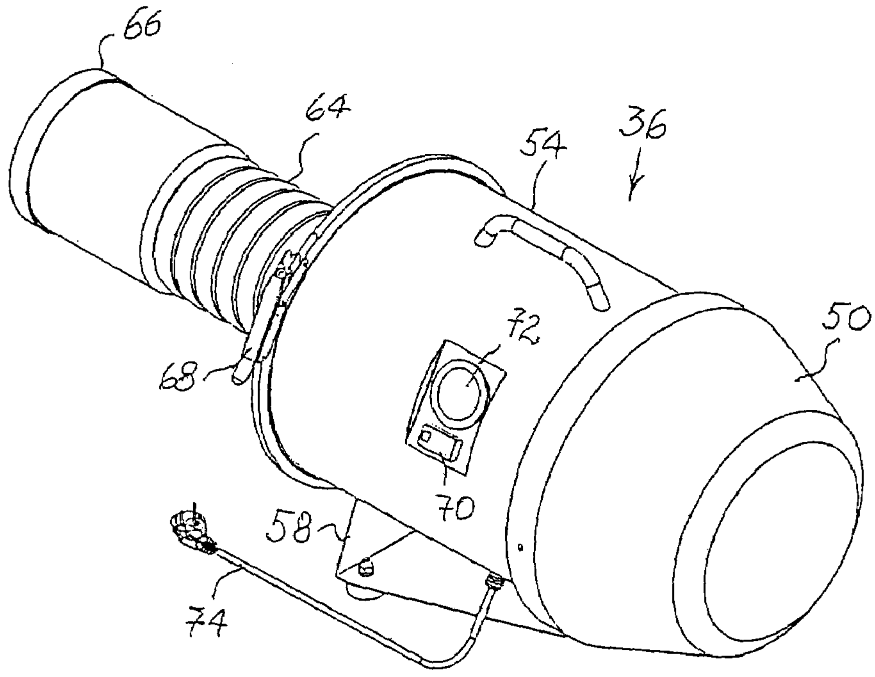
Figure 5:
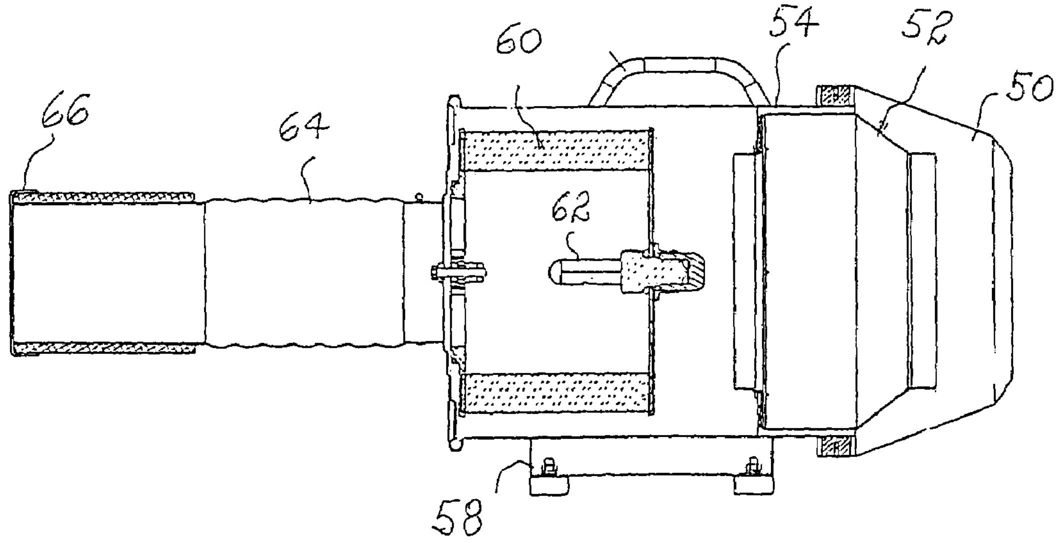

Turning now to FIGS. 4 and 5, there are depicted details of the blower/filter 36. Seen is a noise and air directing cover 50, a blower 52, and a filter housing 54 having a pedestal 58. Inside the housing there is disposed the HEPA filtering element 60 and a UV lamp 62 for radiating ultraviolet light. To the housing 54 there is attached a sleeve 64 having a removable cover 66 for storage purposes. A connector 68 facilitates quick connection between the sleeve 64 and housing 54. Further seen in FIG. 4 is an electrical switch 70 and pressure drop gauge 72, as well as an electrical power cord 74.

The system 2 for protecting and isolating infected or disease-bearing persons operates as follows:

Air from the outside is sucked into the isolation chamber 16 via air inlets 30, passes through the chamber's perforated ceiling 26 and uniformly flows from top to bottom in a laminar flow, without causing any turbulence, and is propelled out of the chamber through the blower/filter 36 which, in the process, destroys the bacteria by means of the UV radiation from the UV lamp 62 (FIGS. 1 and 5). Outside air can similarly enter airlock chamber 18 (FIGS. 2 and 3) through its perforated ceiling 44 resulting from the suction action of blower 48 expelling filtered air after passing the filter 46.

Hence, bacteria contaminated air which passes through the blower/filter 36 and a closely disposed (e.g., <20 cm) UV lamp, reduces or eliminates the potential risk of infection. Instead of, or in addition to the bacteria destroying UV lamp, the surfaces of the filter may be treated with biocides, such as antibacterial chemical substances.

Preferably, the under-pressure which is formed and maintained in the chambers, should be higher than 10 Pa. Also satisfactory results are obtained when the airflow created in the airlock chamber is higher than 0.3 m/sec.

In order to render the system more efficient, there may be provided a sensor, e.g., a volume of movement sensor, indicating entrance of at least one person to the chambers and activating the system.

Figure 6:
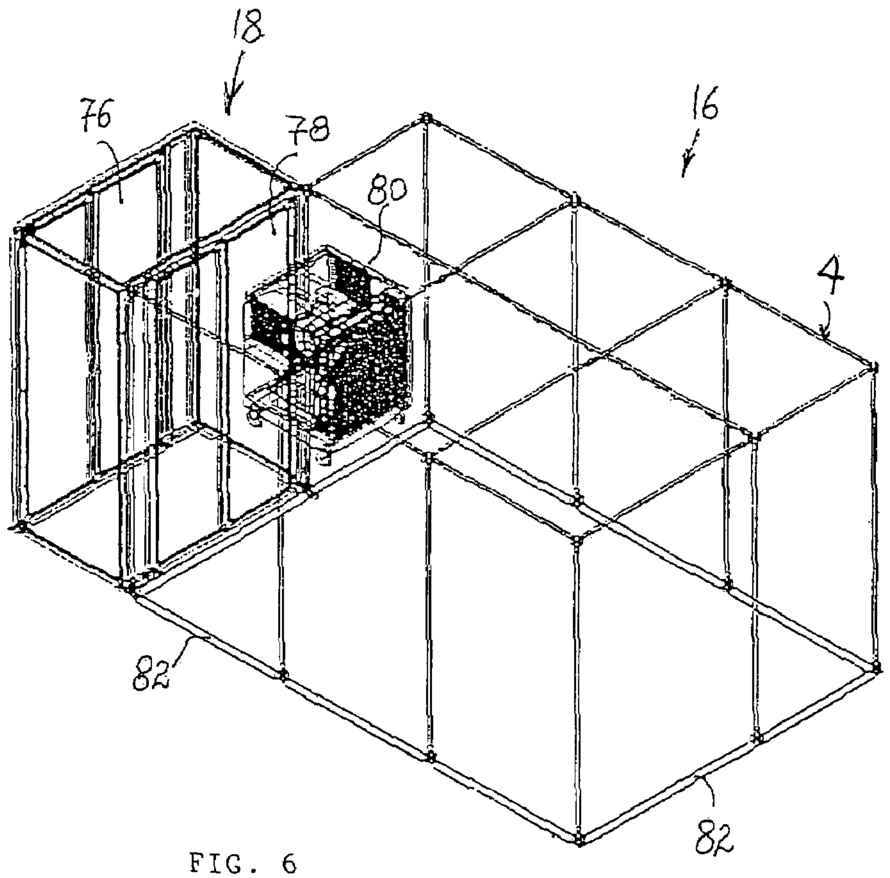

Referring now to FIG. 6, there is shown a further embodiment of the invention in which the entrance and exit to and from the isolation and airlock chambers are effected through single or double wing doors 76,78, advantageously, swinging doors. Also seen is a portable air-filtering unit 80, which can easily be propelled into position after erection of the chambers 16 and 18.

Figure 7B:
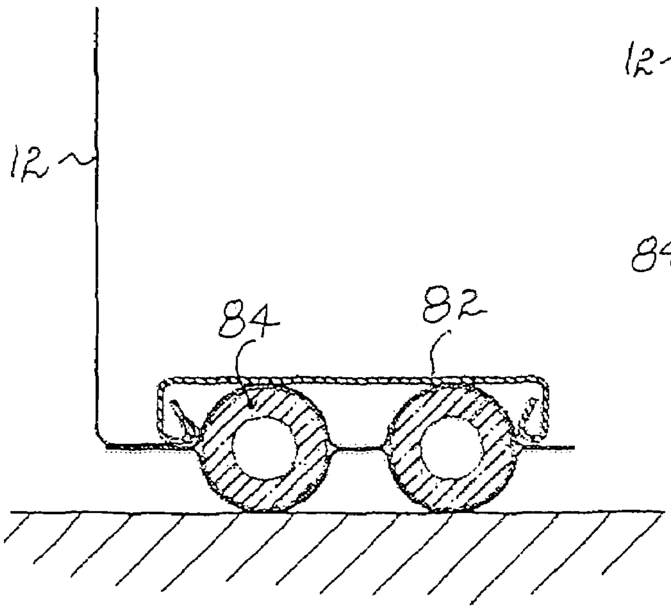
Figure 7A:
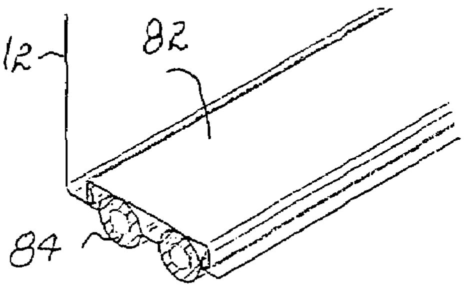

As described hereinbefore, the isolation and airlock chambers should be kept under the influence of under-pressure. In order to more effectively achieve it, the bottom bars or rods of the framework 4 are structured as illustrated in FIGS. 7A and 7B. Seen in these figures are generally U-shaped rails 82, partly accommodating compressible, elongated elements 84, advantageously, tubular elements. In order to retain the elements 84 in place, the elements are wrapped around and held in place by a double layer of the flaps of the flexible material 12 from which the enclosure is made, e.g., by providing at the bottom thereof tubular passages into which preformed elements 84 are inserted, or alternatively, by welding the bottom part around the elements 84.

As can be understood, in addition to the weight of the framework 4, upon causing an under-pressure in the chambers, the rails 82 and elements 84 will be tightly pressed to the ground or floor to maintain the under-pressure inside the chambers. The compressible elements 84 will compensate for unevenness of the floor under the elements, to better seal the framework thereagainst.

The enclosure 12 may be provided with elongated gloves, so as to facilitate treatment of patients from the outside, without having to enter the enclosure.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A system for protection/isolation against infections or disease-bearing persons comprising:

an enclosure defining at least two chambers, an isolation chamber having at least one entering and exiting closable opening, at least one ambient air inlet and at least one air outlet connectable to a blower/filter, and an airlock chamber juxtaposed said opening having an access and egress closable aperture, means for forming under-pressure in said isolation chamber and airlock chamber, a framework for supporting said enclosure and substantially maintaining a desired configuration of the enclosure under conditions of under-pressure, at least one biological filter operationally connected to said means for forming under-pressure, and said framework has at least one bottom U-shaped rail accommodating at least one compressible element coupling the enclosure to said framework.

2. The system as claimed in claim 1, wherein said enclosure is at least partly made of a flexible thin material, impermeable to bacteria and/or viruses, and/or germs.

3. The system as claimed in claim 1, wherein said enclosure has side walls and a floor and at least the floor is made of material heavier than said side walls.

4. The system as claimed in claim 1, wherein said enclosure is attached to said framework from the inside and/or outside of the enclosure, at selected locations.

5. The system as claimed in claim 1, wherein said framework includes means for attaching to adjacently disposed similar frameworks or stationary structures.

6. The system as claimed in claim 1, wherein said framework is composed of dismantable rods and interengaging and interlocking joints.

7. The system as claimed in claim 1, wherein at least one of said inlet valves is located at a wall or ceiling of said airlock chamber.

8. The system as claimed in claim 1, wherein at least one additional valve of said inlet valves is located in a wall common to said isolation chamber and said airlock chamber.

9. The system as claimed in claim 7, further comprising a blower for sucking air out of said airlock chamber through a further biological filter.

10. The system as claimed in claim 1, wherein said enclosure comprises a perforated ceiling for entering evenly distributed flow of air.

11. The system as claimed in claim 9, wherein said airlock chamber comprises a perforated ceiling for entering evenly distributed flow of air.

12. The system as claimed in claim 1, wherein said biological filter comprises at least one source of UV light for destroying bacteria.

13. The system as claimed in claim 1, wherein inside surfaces of said biological filter are treated with biocides.

14. The system as claimed in claim 1, wherein said closeable opening and aperture are two-wing swingable doors.

15. The system as claimed in claim 1, further comprising means for sealing the enclosure to the ground or floor.

16. The system as claimed in claim 1, wherein said elements are elongated compressible elements held inside elongated tubular passages made in said enclosure.

17. A kit for assembling a system according to claim 1 for protection/isolation against infections or disease-bearing persons.

18. A method for protecting/isolating against infection or disease-bearing persons, comprising providing a system as claimed in claim 1, and operating said means for forming under-pressure in said chambers.

19. The method as claimed in claim 18, wherein said means for forming under-pressure in said chambers comprises additional air sucking and filtering means for generating in said airlock chamber an air flow greater than 0.3 m/sec.

* * * * *